United States Patent [19]

Sorlien

[11] Patent Number: 4,497,760
[45] Date of Patent: Feb. 5, 1985

[54] CABLE SHEATH REPAIR METHOD

[75] Inventor: Mark D. Sorlien, White Bear Lake, Minn.

[73] Assignee: Minnesota Mining and Manufacturing Company, St. Paul, Minn.

[21] Appl. No.: 471,519

[22] Filed: Mar. 2, 1983

[51] Int. Cl.³ .................. B29C 27/24; B32B 35/00
[52] U.S. Cl. .................................. 264/36; 156/86; 156/94; 264/230
[58] Field of Search .............. 264/36, 230, DIG. 71; 156/86, 94, 273.9, 379.6

[56] References Cited

U.S. PATENT DOCUMENTS 2,930,634  3/1960  Merritt ................................. 156/94
3,235,289  2/1966  Jones .................................. 156/86

Primary Examiner—Jan Silbaugh
Attorney, Agent, or Firm—Donald M. Sell; James A. Smith; Terryl K. Qualey

[57] ABSTRACT

A method of repairing damage to the sheath of a communications cable in which a heat shrinkable material is wrapped around the communications cable to bridge across the damaged area of the sheath. A flexible strip heater having a base with a heating element in a portion of its width and a parallel insulating layer overlying only a portion of the base is wrapped in a spiral around the heat shrinkable material with the portion having the insulating layer wrapped on the portion of the previous turn not having the insulating layer. The insulating layer substantially abuts itself in adjacent turns of the heater to position the portions of the base containing the heating element adjacent each other along the heat shrinkable material. The heating element is activated to cause the heat shrinkable tape to shrink tightly onto the communications cable to cover the damaged portion of the sheath and, the flexible strip heater is then removed.

1 Claim, 9 Drawing Figures

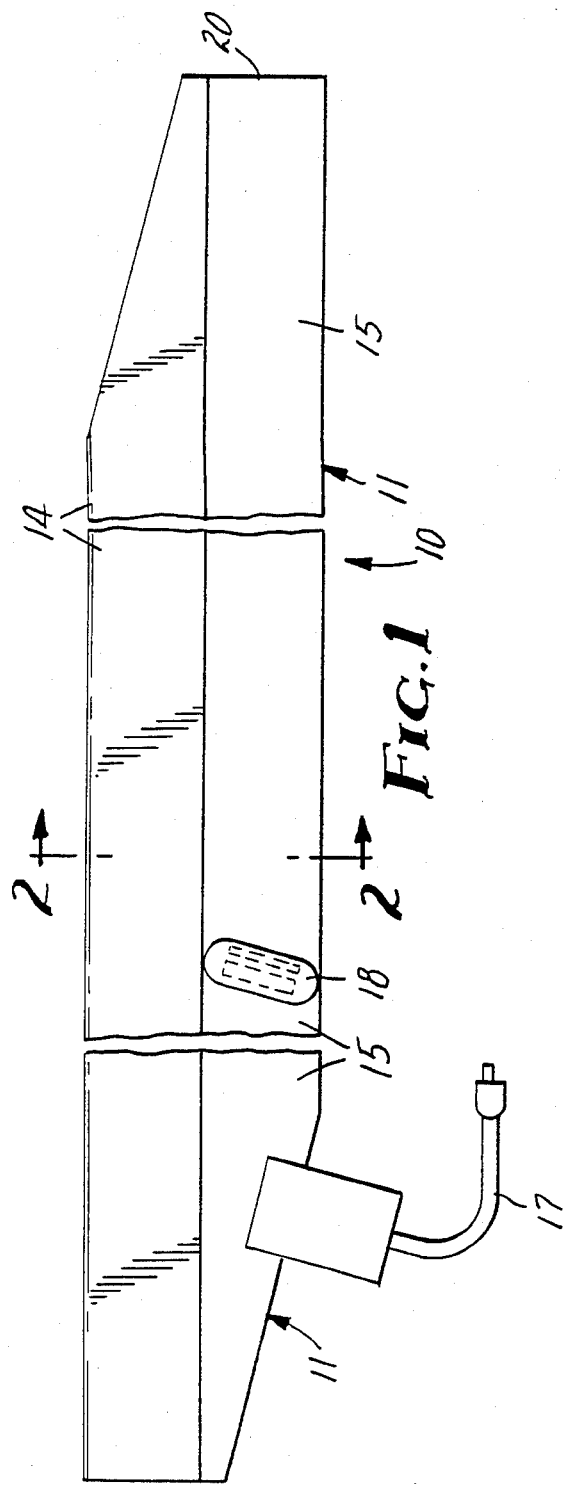
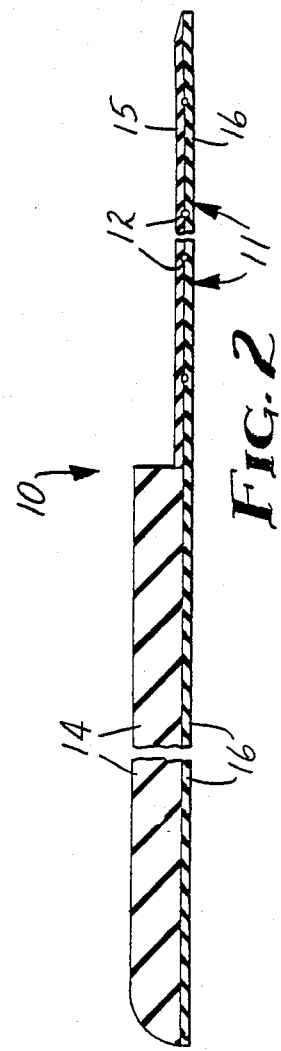

CABLE SHEATH REPAIR METHOD

FIELD OF THE INVENTION

The present invention relates to a method for repairing damage to the sheath of a communications cable.

BACKGROUND OF THE INVENTION

Communication cables are typically constructed with an outer protective sheathing consisting of polyethylene or lead. This sheathing serves to protect the underlying metallic shielding and conductor bundle from moisture ingress as well as from physical damage. Many of these cables are pressurized with dried air pumped from a local switching office under low pressure to insure that if leaks do occur in the sheath, a positive pressure within the cable will tend to keep moisture from entering the leaks. However, even with pressurized cable, any significant damage to the cable sheath must be repaired to prevent overburdening the air pressure system. And, in non-pressurized systems or in high moisture areas sheath damage must be repaired to assure that ingress of water is prevented.

Heat shrinkable materials are widely used for the repair of damage to telecommunications cable sheaths. The ability of heat shrinkable materials to achieve a good bond and excellent conformity to cable sheath materials makes them the method of choice where safe practice allows. The heat shrinkable materials typically consist of a polymeric tape or sheet that shrinks when heated and is coated on one surface with a heat activated adhesive for bonding the heat shrinkable material to the cable sheath. Gas torches are currently used to shrink the heat shrinkable material and to activate the adhesive for bonding. The torch, however, produces uneven heating because it only covers a small area at a time and it must be rotated around the cable. This makes the use of the torch dangerous because the operator tends to be pointing the torch at himself during a part of the operation. Moreover, the torch is unusable in cramped spaces or if several cables run together, as in a manhole or cable vault. Also, the torch is usually prohibited from being used in manholes and cable vaults because of the possible danger of igniting built-up explosive gases. Consequently, heat shrinkable materials are not often used in manholes or cable vaults.

A common area at which damage to telephone cable sheath occurs is at the entrance to a manhole or a cable vault from a cable duct. Cables entering the manhole or vault from the cable duct are frequently bent at the entrance area up to 90° causing stress in the cable sheath. This region will often develop cracks and splits in the cable sheath due to the stress. And, even where a torch is permitted in a manhole or cable vault, repairs at the entrance face and inside the duct are inaccessible to a torch.

The prior art includes strip heaters as disclosed in U.S. Pat. Nos. 2,719,907; 3,049,465 and 4,363,947 and German Offenlegungsschrift No. 1,804,649. It also includes other electrical resistance heaters for cylindrical objects such as the heaters disclosed in U.S. Pat. Nos. 2,617,916; 4,032,380; and 4,362,684. However, none of these patents discloses a method of cable sheath repair, none of the heaters they disclose is designed for heating a heat shrinkable material to repair a communications cable, and none of them would be useful in providing cable sheath repair at the cable duct entrance to a manhole or cable vault.

SUMMARY OF THE INVENTION

The present invention provides a method for repairing damage to the sheath of a communications cable. A heat shrinkable material is wrapped around the communications cable in a sufficient length along the cable to bridge across the damaged area of the sheath. A flexible strip heater is provided having a base with a uniform width along a majority of its length, a resistance heating element insulated within the base and extending along the length of the base across a uniform portion of its width, and having an insulating layer overlying only a portion of the base along the length thereof and having a uniform width equal to that of the portion containing the resistance heating element, the insulating layer having a generally rectangular transverse cross section. The flexible strip heater is wrapped around the heat shrinkable material in a spiral with overlapping of the heater portion having the insulating layer on the portion of the previous turn not having the insulating layer to cause the insulation portion to substantially abut in adjacent turns of the heater. The heating element is then activated to cause the heat shrinkable tape to shrink tightly onto the communications cable to cover the damaged portion of the sheath and the flexible strip heater is removed.

If the heat shrinkable material and the strip heater are loosely wrapped around the cable, the rearward end of the heater may be pushed on to slide the heater and heat shrink material along the cable to accurately position the heat shrinkable material over the damaged area of the cable sheath. If the damage is at the cable duct entrance to a manhole or a cable vault, the heat shrinkable material and heater may be slid partially into the cable duct so that the heat shrinkable material properly bridges the damaged area of the sheath.

THE DRAWING

In the drawing:

FIG. 1 is a plan view of a strip heater utilized in the method of the present invention;

FIG. 2 is a cross sectional view taken along line 2—2 of FIG. 1;

DESCRIPTION OF THE PREFERRED EMBODIMENT

Figure 3:
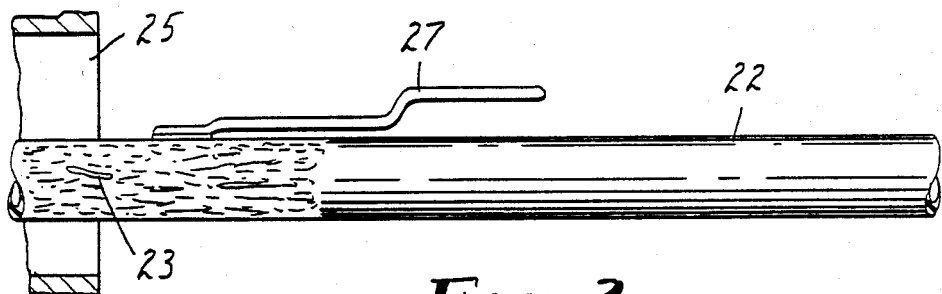
FIG. 3 is an elevation view, partially in section, illustrating preparation of a telephone cable for repair of the sheath damaged at a cable duct entrance to a manhole or cable vault.

The strip heater 10 illustrated in FIGS. 1-2 comprises a thin, flexible, elongate fiber reinforced base 11, resistance wire 12 within the base along the length and across one half of the width of the base, and a flexible insulating layer 14 overlying one surface of the base and extending the length of the base and across the one-half of the width thereof that does not contain the resistance wire. Thus, the width of the insulating layer 14 is equal to the width of the portion of the base 11 containing resistance wire 12.

The base 11 has a uniform width along a majority of its length and is preferably constructed of fiberglass cloth impregnated with silicone rubber. In the illustrated embodiment the portion of the base 11 that contains the resistance wire 12 consists of two layers 15 and 16 of the fiberglass cloth impregnated with silicone rubber between which the resistance wire 12 is sandwiched. The construction is vulcanized so that the wires are completely insulated. This construction has been found to have the desired flexibility, insulation, tensile strength and wear resistance.

The resistance wire is preferably nichrome wire. In the illustrated embodiment it is in the form of eight parallel wires 12 running the length of the base 11 across one half of the width of the base. The resistance wires 12 provide for resistance heating along the length of the base across only one half of its width.

The insulating layer 14 has a transverse cross section that is generally rectangular. It is preferably formed as a nonreinforced strip of silicone rubber which is bonded to one surface of the base 11 to cover the portion of the width of the base 11 that does not contain the resistance wires 12. In the illustrated embodiment, while the resistance wires 12 are laminated between two layers 15 and 16 of fiberglass reinforced silicone rubber, only the bottom layer 16 extends the full width of the heater to provide the base for the insulating layer 14.

The resistance wires 12 are connected to a power cord 17 adjacent the trailing end of the heater and a thermostat 18 is included on the heating portion of the strip to control the temperature applied by the heater. The leading end 20 of the heater, which is to be used as the start of the wrapping of the heater, is tapered in the portion of its width containing the insulating layer 14 from a narrower width at the leading end 20 to its generally uniform width along its length. This permits the leading end to be wrapped around a cable to form a spiral with nearly a square leading end. It is likewise preferable to taper the trailing end of the heater across the heated portion, as illustrated, to provide a nearly square trailing end. The illustrated tapers of the leading and trailing ends of the heater require the heater to be wrapped in a right hand spiral but the tapers could be made in the opposite directions if a left hand spiral is desired.

A presently preferred embodiment of the heater 10 has a 4.5 inch (11.5 cm) width and a 6 foot (185 cm) length. Each of the fiberglass reinforced silicone rubber layers 15 and 16 is 0.030 inch (0.076 cm.) thick, and the insulating layer is 0.125 inch (0.318 cm.) thick and 2.25 inches (5.7 cm.) wide. The ends of the heater 10 are tapered along 7 inches (17.8 cm.) of the length of the heater. The thermostat 18 is designed to cut out at 300° F. (150° C.).

Figure 4:
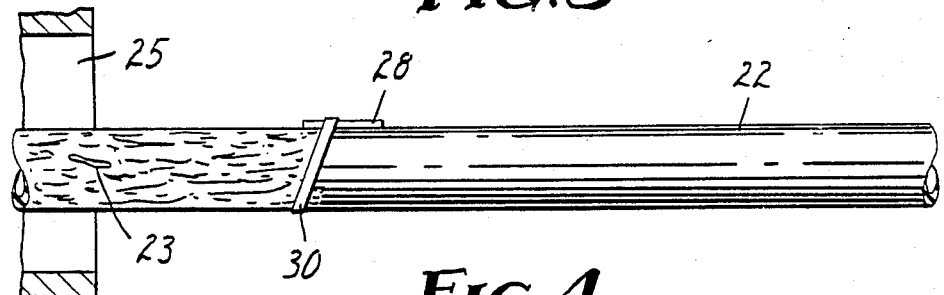
FIG. 4 is a view similar to that of FIG. 3 illustrating the application of a spacer material following the cable preparation.
Figure 5:
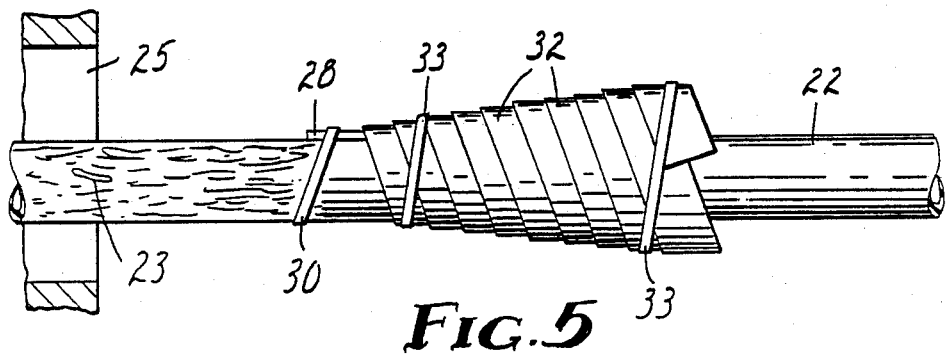
FIG. 5 is a view similar to that of FIGS. 3 and 4 illustrating the spiral wrapping of a heat shrinkable tape beginning at the spacer material.
Figure 6:
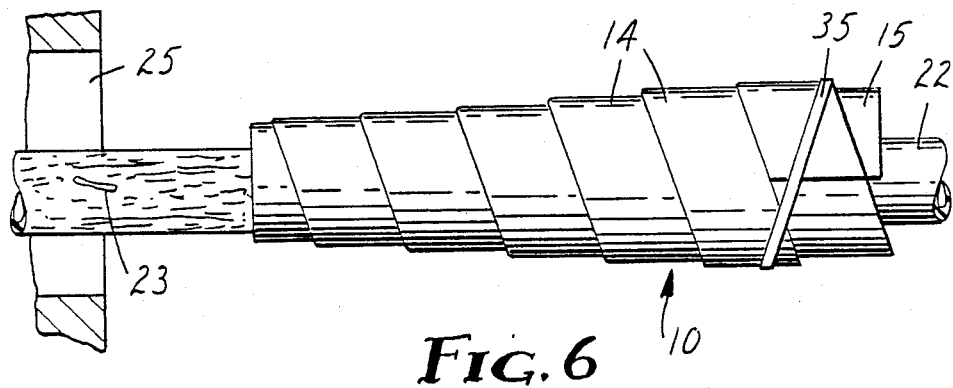
FIG. 6 is a view similar to that of FIGS. 3-5 after the spacer material is removed and the strip heater is spiral-wrapped over the heat shrinkable tape.

FIGS. 3 through 8 illustrate the use of the strip heater of FIGS. 1 and 2 in the method of the present invention. Illustrated is the repair of a cable sheath 22 having a slit 23 at the interface between a cable duct 25 and a manhole or a cable vault. FIG. 3 illustrates the use of a tool 27 having an abrasive pad for cleaning and scuffing the cable sheath 22 around the slit 23 to assure a good bond to the sheath. Next, as illustrated in FIG. 4, a small spacer 28 is placed on the cable sheath 22 outside of the duct 25 and it is held in place with a piece of pressure sensitive adhesive tape 30. The spacer is preferably 0.375 inch (0.95 cm.) to 0.5 inch (1.25 cm.) in its dimension radially outward from the cable sheath 22. Next, a heat shrinkable tape 32, with a heat activated adhesive on one face thereof, is wrapped in a right hand spiral beginning on the spacer 28, as illustrated in FIG. 5. The heat shrinkable tape 32 is wrapped with its heat activated adhesive coated surface facing the cable sheath 22 and the successive turns overlapping approximately one half the width of the tape. When the spiral is completed, a strip of high temperature pressure sensitive adhesive tape 33 is wrapped around both ends of the spiraled heat shrinkable tape 32 to retain it in the spiral configuration. The spacer 28 is next removed leaving the spiraled heat shrinkable tape free to slide along the cable.

Figure 7:
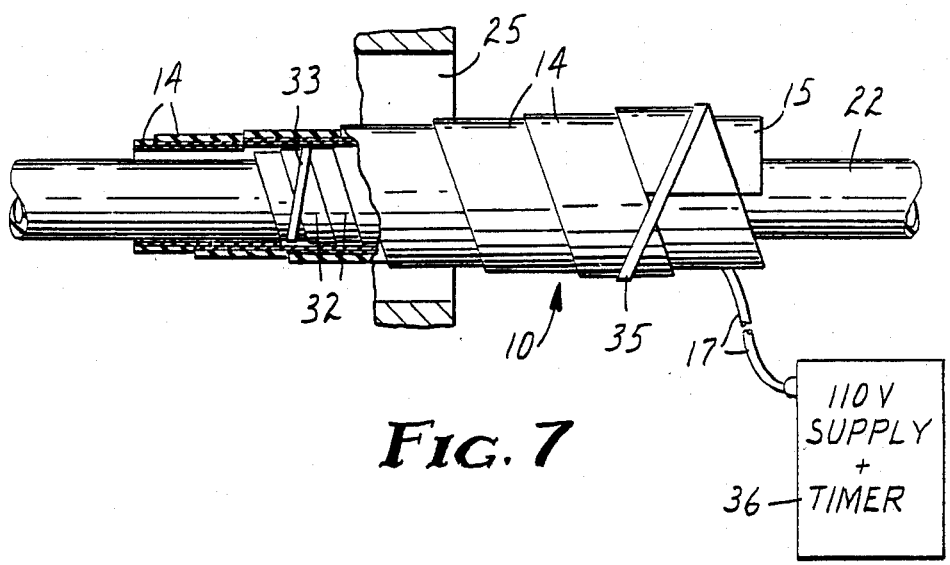
FIG. 7 is a view similar to that of FIGS. 3-6 illustrating the sliding of the strip heater and heat shrinkable tape along the cable and partially into the cable duct and the connection of the heater to an electrical supply and timer.
Figure 8:
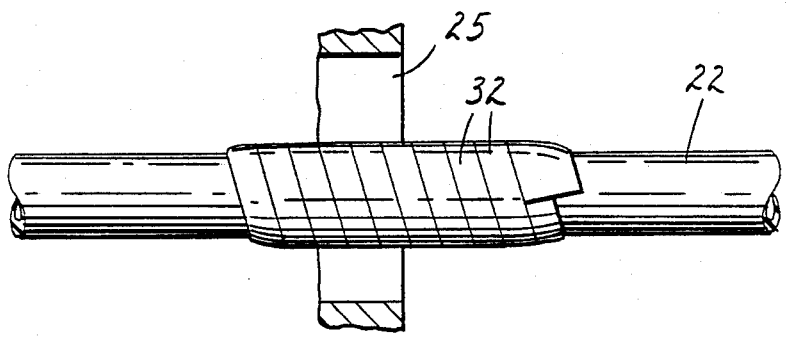
FIG. 8 is a view similar to that of FIGS. 3-7 after shrinking of the heat shrinkable material to repair the cable sheath and removal of the strip heater.

The strip heater 10 is then wound in a right hand spiral on the spiral of heat shrinkable tape 32 which provides support for wrapping the heater. In the second and successive wraps of the heater the portion thereof containing the insulating layer 14 is wrapped over the portion containing the resistance wires 12 to provide a nearly continuous outer insulating layer and to provide a nearly continuous heating surface on the spiral of heat shrinkable tape 32. When the heater spiral is completed a strip of high temperature pressure sensitive adhesive tape 35 is wrapped around the rearward end of the heater to retain the spiral configuration. The spiraled heater and the spiraled heat shrinkable tape 32 within the heater are next slid along the cable partially into the cable duct 25 to properly position the heat shrinkable tape bridging the slit 23 in the sheath 22, as illustrated in FIG. 7. The power cord 17 is then plugged into an electrical supply and timer 36, and the timer is set to provide electricity to the heater for a predetermined time sufficient to shrink the heat shrinkable tape 32 tightly on to the cable sheath and to activate the heat activated adhesive on the tape to cause it to bond to the cable sheath 22. When the tape has been properly shrunk onto the cable sheath and bonded thereto and the heater has cooled down, the heater 10 is pulled out of the cable duct 25 and removed from the cable for subsequent use. The resulting cable sheath repair after removal of the heater is illustrated in FIG. 8.

The presently preferred heat shrinkable tape 32 is a cross-linked polyolefin backing with a heat activated adhesive coating on one surface sold by the assignee of the present invention as "3M Brand Heat Reactive Tape #6000". The preferred high temperature pressure sensitive adhesive tape for strips 33 and 35, which may also be used as the tape strip 30 applied over the spacer 28, is a high temperature fiberglass cloth backing coated with a silicone pressure sensitive adhesive, sold by the assignee of the present invention as "Scotch Brand Electrical Tape #69".

Figure 9:
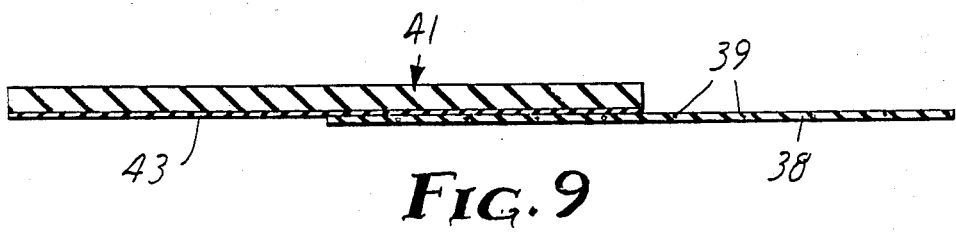
FIG. 9 is a cross-sectional view, similar to that of FIG. 2, of a second strip heater which may be utilized in the method of the present invention.

A second embodiment of a strip heater to be utilized in the method of the present invention is illustrated in FIG. 9. It is illustrated in a cross-sectional view similar to that of FIG. 2 to show the differences from the embodiment of FIGS. 1 and 2. In this embodiment the fiber reinforced base 38 has resistance wires 39 across its entire width. As in the first embodiment, the insulating layer 41 overlies only a portion of the width of the base 38. In this embodiment the insulating layer 41 has its own fiber reinforced support layer 43 by which it is bonded to the base 38. The insulating layer 41 has a width equal to the width of the base 38 so that it has a width equal to the portion of the base containing the resistance wires, as in the first embodiment. The FIG. 9 embodiment, in its use in the method of the present invention, is intended to be spiral-wrapped around a cable with the insulating portion 41 that extends beyond the edge of the base 38 overlapping the portion of the base in the adjacent turn that does not have an insulating layer on it. It will be seen that with the embodiment of FIG. 9 the spiral-wrapping will create a true cylinder instead of the slightly conical shape obtained with the embodiment illustrated in FIGS. 1 and 2, illustrated in FIGS. 6 and 7. The FIG. 9 embodiment may thus be preferred when a heat shrinkable sleeve is used instead of the illustrated heat shrinkable tape which itself results in a conical structure upon spiral-wrapping, as illustrated in FIG. 5.

I claim:

1. A method of repairing damage to the sheath of a communications cable, comprising the steps of:
    applying a spacer material to the cable,
    wrapping a heat shrinkable tape around the communications cable in a spiral starting on said spacer with partial overlapping of the adjacent turns and in sufficient length along the cable to bridge across the damaged area of the sheath.
    removing said spacer material,
    providing a flexible strip heater having a base with a uniform width along a majority of its length, a resistance heating element insulated within said base and extending along the length of said base and across a uniform portion of its width, and an insulating layer overlying only a portion of the width of said base along the length thereof and having a width equal to that of said portion containing said resistance heating element, said insulating layer having a generally rectangular transverse cross-section.
    wrapping said flexible strip heater around said heat shrinkable material in a spiral with overlapping of the heater portion having said insulating layer on the portion of the previous turn not having said insulating layer to cause said insulating layer to substantially abut in adjacent turns of the heater,
    sliding said spiral wound heater and heat shrinkable tape together along the cable to accurately position said spiraled tape to bridge the damaged area of the sheath,
    activating said heating element to cause said heat shrinkable tape to shrink tightly onto said communications cable to cover the damaged portion of the sheath, and
    removing said flexible strip heater.

* * * * *